(12) United States Patent
Garcia-Osuna et al.

(10) Patent No.: US 7,085,194 B2
(45) Date of Patent: Aug. 1, 2006

(54) METHODS AND SYSTEMS FOR CALIBRATING ACOUSTIC RECEIVERS

(75) Inventors: Fernando Garcia-Osuna, Sugar Land, TX (US); Toru Ikegami, Danbury, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/735,373

(22) Filed: Dec. 12, 2003

(65) Prior Publication Data

US 2005/0128871 A1  Jun. 16, 2005

(51) Int. Cl.
*H04B 17/00* (2006.01)
*G01V 13/00* (2006.01)

(52) U.S. Cl. .......................................... 367/13; 73/1.85
(58) Field of Classification Search ................ 367/13, 367/25; 181/102; 73/1.82, 1.85
See application file for complete search history.

(56) References Cited

U.S. PATENT DOCUMENTS

| | | | |
|---|---|---|---|
| 2,944,621 A | | 7/1960 | Loofbourrow |
| 2,970,666 A | * | 2/1961 | Smith .......................... 73/1.83 |
| 3,056,105 A | | 9/1962 | Ball et al. |
| 3,056,464 A | * | 10/1962 | Marks .......................... 181/102 |
| 4,531,204 A | * | 7/1985 | Vanderschel .................. 367/25 |
| 4,809,236 A | | 2/1989 | Hsu et al. |
| 4,953,137 A | * | 8/1990 | Medlin .......................... 367/31 |
| 5,377,160 A | * | 12/1994 | Tello et al. .................... 367/35 |
| 2003/0167835 A1 | * | 9/2003 | Sinha et al. ............. 73/152.16 |
| 2003/0179651 A1 | | 9/2003 | Nutt et al. |

FOREIGN PATENT DOCUMENTS

SU 684481 * 9/1979

OTHER PUBLICATIONS

H-P. Liu, R.E. Warrick. "Effect of cable capacitance on in-situ borehole geophone calibration". Geophysics, vol. 63., No. 1, 1998, pp, 18-24.

* cited by examiner

*Primary Examiner*—Ian J. Lobo
(74) *Attorney, Agent, or Firm*—Karan Singh; William Batzar; Dale Gaudier

(57) ABSTRACT

A method and system for calibrating acoustic receivers (112). The method and system facilitate calibrating the acoustic receivers (112) while they are mounted to a downhole acoustic tool (102). Calibrating the acoustic receivers (112) in situ provides more accurate results than previously available. The method and system provide separate compensation factors for the acoustic receivers (112) at different frequencies and for different transmission sources. The separate compensation factors facilitate more accurate signal acquisition over a wider range of conditions.

11 Claims, 10 Drawing Sheets

METHODS AND SYSTEMS FOR CALIBRATING ACOUSTIC RECEIVERS

FIELD OF THE INVENTION

The present invention relates generally to methods and systems for investigating subsurface formations using acoustic measurements made in a borehole. More particularly, this invention is directed to methods and systems for calibrating acoustic receivers used to collect acoustic measurements along a borehole.

BACKGROUND OF THE INVENTION

The generation and recording of borehole acoustic waves is a key measurement employed in oilfield borehole logging. Many borehole tools and methods are currently available for taking acoustic measurements. Some tools include a single source of sonic waves and two or more receivers, however, most of the tools now include two or more acoustic sources and many receivers arranged in an array. While the currently available acoustic tools are useful in providing a large range of information regarding the adjacent formation and the borehole parameters, a primary use of acoustic borehole measurements is the estimation of compressional wave and shear wave formation slowness.

Compressional wave formation slowness is typically estimated using travel times acquired via a first motion detection process. In the case of a single source, two receiver tool suggested by the prior art, formation slowness is estimated by subtracting the arrival times between two receivers and dividing by the inter-receiver spacing. This estimate, however, is subject to inaccuracies due to tool tilt, borehole washouts, bed boundary effects, etc. Additional acoustic sources and receivers and more robust methods such as STC (Slowness-Time-Coherency analysis) among others have been used to reduce the inaccuracies introduced by such environmental effects.

Compressional waves are detectable with monopole measurements. However, in slow formations shear waves are not detectable with monopole measurements. Directional or dipole acoustic sources facilitate detection of both compressional waves and shear waves. Nevertheless, monopole and quadrupole contamination of dipole measurements is a chief problem with acoustic logging tools using arrays of receivers. Acoustic receivers often have different sensitivities, and different sensitivities to the same wave results in a greater possibility of non-dipole contamination. Even similarly or identically manufactured receivers tend to report different amplitudes and time receipts (i.e. amplitude and phase mismatch). Therefore, it is usually necessary to calibrate acoustic logging tools by detecting and correcting amplitude and phase mismatch of the various receivers mounted to the logging tools to improve slowness estimation and downhole modal computation.

Typically, local personnel separately calibrate each individual receiver before each logging operation in an attempt to correct amplitude and phase mismatch. While such calibrations may help, each receiver is calibrated before it is mounted to the tool and with the receivers subjected to atmospheric conditions. However, many factors may combine to cause significant sensitivity variations despite the usual calibration efforts. Some of the factors that cause sensitivity variations include the position and alignment of the receivers, the downhole electronics, environmental factors such as pressure and temperature, and others. Normally the receivers will be subjected to conditions much different from the surface calibration conditions, and it is currently difficult or impossible to account for variations resulting from the eventual positioning and alignment of the receivers on the logging tool. When operated, the receivers are housed in oil-filled sondes, but during calibration they are exposed to air. Therefore, even though some receiver suppliers guarantee small ($\leq 5\%$) sensitivity variations for receivers individually, after the receivers are mounted to an acoustic tool, the sensitivity variations are usually no longer within the prescribed parameters.

Furthermore, many acoustic logging tools employ dozens of receivers or more. As the demand for more and more accurate logging data increases, so does the number of receivers used with logging tools. Accordingly, the calibration of each individual receiver becomes a very time consuming and expensive proposition. Yet, as discussed above, even the expensive and time consuming methods currently available have limited effectiveness. The current calibration methods neglect many important factors, including the eventual positioning of the receivers on the logging tool and the actual operating environment.

The present invention is directed to overcoming, or at least reducing the effects of, one or more of the problems outlined above.

SUMMARY OF THE INVENTION

The present invention meets the above-described needs and others. Specifically, the present invention provides a method and system for calibrating acoustic receivers. The method and system facilitate calibration of acoustic receivers in situ. Prior calibration techniques calibrate the acoustic receivers before they are mounted to a tool. The present invention calibrates the acoustic receivers with the receivers mounted to the tool. The calibration of the acoustic receivers while mounted to the tool results in more accurate logging data.

According to some aspects of the invention, the methods and systems facilitate calibration of the acoustic receivers by implementing a procedure to correct and compensate for amplitude and phase mismatch between different receivers. The procedure may verify and correct an acoustic receiver's response to ensure proper operation, and reject non-dipole modes when dipole measurements are of interest. The procedure may include calculating different compensation factors for different frequency ranges and account for different acoustic transmission sources.

According to one aspect of the invention, amplitude and phase compensation factors for one or more individual acoustic receivers are determined from stationary measurements at low, mid, and high frequencies created in an acoustic chamber housing the tool. Raw waveform signals resulting from multiple tool orientations are averaged and windowed. Multiple frames for each acoustic transmitter and logging frequency are acquired and averaged at each tool orientation to compute compensation factors for one or more of the acoustic receivers.

According to some aspects of the invention, shear wave measurements are compensated with the low frequency compensation factors, and high frequency compressional waves measurements are compensated with the mid and high frequency compensation factors. The calibration procedure identifies the functionality and sensitivity of each receiver, assigns the most sensitive receiver as a reference, and computes gain and delay factors for the remaining receivers based on differences between the reference receiver and remaining receivers.

According to some aspects of the invention, application of the calibration process assures a maximum level of amplitude mismatch between receivers of about 1.0 dB, and a maximum phase mismatch between receivers of about 1.5 degrees. By assuring maximum mismatch levels between receivers, a dipole to monopole ratio will generally be ≧30 dB, which guarantees the rejection of monopole, quadrupole, and sextupole modes within dipole measurements.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Throughout the drawings, identical reference numbers designate similar, but not necessarily identical, elements.

DETAILED DESCRIPTION OF THE PREFERRED EMBODIMENTS

Illustrative embodiments and aspects of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The present invention contemplates calibration of acoustic receivers of an acoustic tool with the acoustic receivers mounted to the acoustic tool. As mentioned above, historically, acoustic receivers have been calibrated separate from the tool and at atmospheric conditions. The accuracy of the historical calibration is compromised because the eventual positioning of the receiver on the tool and other factors cannot be accurately accounted for separate from the tool. The present invention provides methods and systems for calibrating acoustic receivers in situ. The methods and systems may be particularly well suited to in situ calibration of sonic logging tools used in wellbores. However, the methods and systems presented herein are not so limited. The methods and systems may be applied to any calibration technique. Further, although particular methods are described below that facilitate calibrating acoustic receivers while the acoustic receivers are mounted to the acoustic tool, the particular methods are not limiting. Any method of calibrating acoustic receivers with the acoustic receivers mounted to the tool is contemplated by the present invention.

As used throughout the specification and claims, the term "low" as used to modify a frequency means below approximately 7 kHz. The term "mid" refers to a frequency ranging between approximately 7 and 16 kHz. "High" frequency means a frequency above approximately 16 kHz, or between approximately 16 kHz and 25 kHz. "Interstitial" means spaces between two or more components. The words "including" and "having," as used in the specification, including the claims, have the same meaning as the word "comprising."

Figure 1:
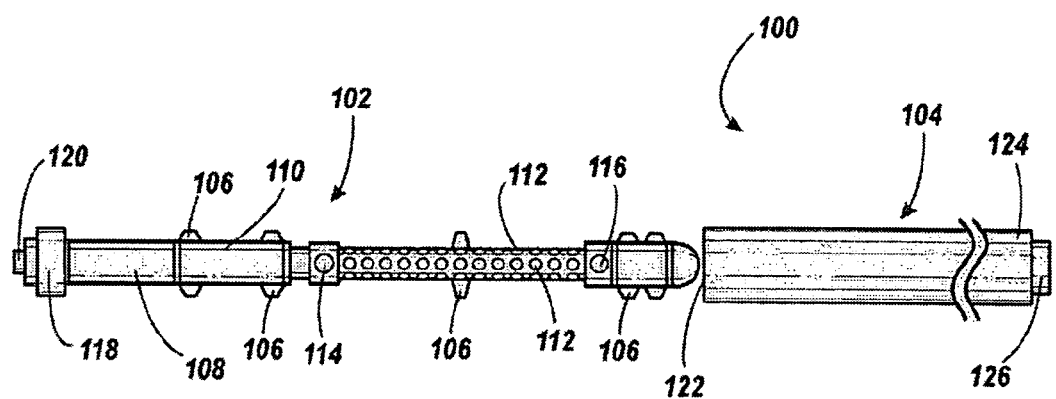
FIG. 1 is an assembly view of an acoustic tool and an acoustic chamber according to one embodiment of the present invention.

Turning now to the figures, and in particular to FIG. 1, an acoustic tool calibration system (100) according principles of the present invention is shown. The acoustic tool calibration system (100) includes an acoustic tool, for example a sonic tool (102). The sonic tool (102) may be any acoustic tool and is not limited to the configuration shown. The acoustic tool calibration system (100) also includes an acoustic chamber, which, according to the embodiment of FIG. 1, is a cylindrical waveguide sonic tube (104). For short, the sonic tube (104) is receptive of the sonic tool (102). The sonic tube (104) may have a diameter that is greater than a diameter of the sonic tool (102). Therefore, the sonic tube includes a plurality of spacers (106) arranged about the sonic tool (102) at one or more axial positions to support the sonic tool (102) substantially concentric with the cylindrical sonic tube (104).

The sonic tool (102) includes an electronics package (108) and a compensator housing (110) for facilitating data acquisition and calibration. The sonic tool (102) also includes one or more acoustic receivers and one or more acoustic transmitters or sources. According to the embodiment of FIG. 1, the sonic tool (102) includes an array of sonic receivers (112) arranged in 13 rows or stations. Each of the 13 receiver stations includes a plurality of azimuthally arranged sonic receivers (112). According to the embodiment of FIG. 1, there are 8 azimuthally arranged sonic receivers (112) at each of the 13 receiver stations. It will be understood by those of skill in the art having the benefit of this disclosure, however, that other sonic receiver arrangements may also be used. The array of sonic receivers (112) shown in FIG. 1 is exemplary in nature and used to illustrate principles of the invention as described in further detail below.

According to FIG. 1, the one or more acoustic transmitters comprise a first or upper monopole transmitter (114) and a second or lower monopole transmitter (116). A collar (118) arranged at a first or upper end (120) facilitates sealing the sonic tool (102) within the sound absorbing sonic tube (104). The sonic tube (104) is generally cylindrical and includes a first or open end (122) a second end (124) closed by a plug (126).

Figure 2:
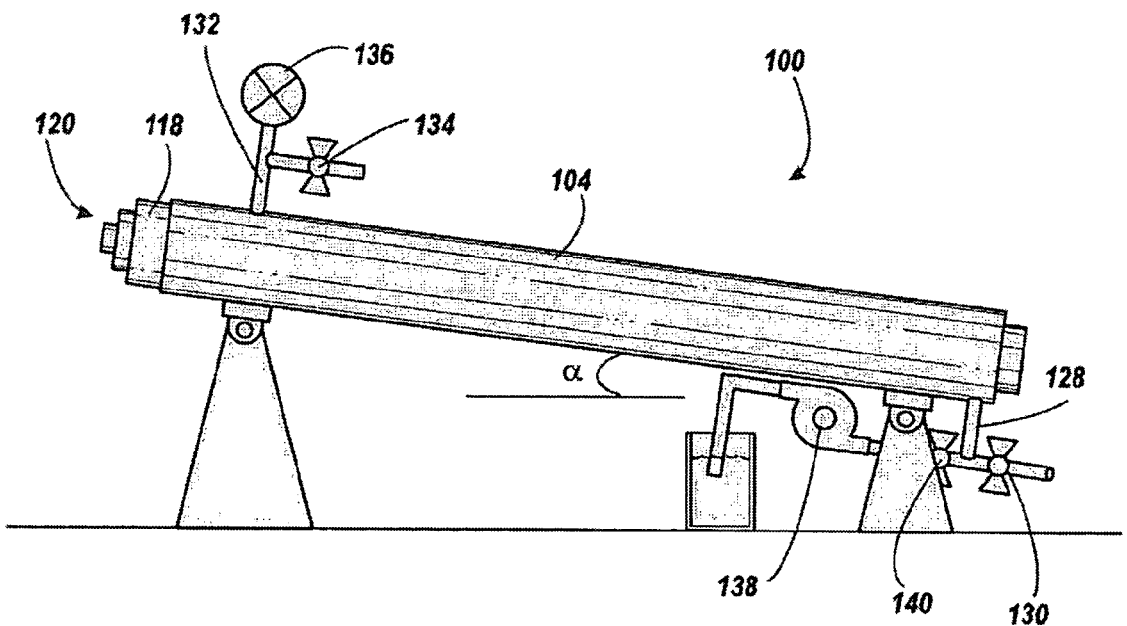
FIG. 2 is a perspective view of the acoustic chamber of FIG. 1 housing the acoustic tool according to one embodiment of the present invention.

Prior to calibrating the sonic receivers (112), the sonic tool (102) is preferably inserted into the sonic tube (104) with the collar (118) sealing the open end (122) as shown in FIG. 2. A fluid supply, for example a water hose, is in fluid communication with a fill line (128) of the sonic tube (104). The fill line (128) has a fill valve (130) disposed therein. When the fill valve (130) is open, water flows through the fill line (128) and enters the sonic tube (104). The water fills all of the interstitial spaces between the sonic tool (102) and the sonic tube (104).

In addition to the fill line (128), the sonic tube (104) may include a second line (132) with an air release valve (134) disposed therein. Accordingly, when the sonic tube (104) is filled with water, the air release valve (134) may be opened to permit any air trapped in the sound absorbing sonic tube (104) to exhaust. The second line (132) may also include a pressure gauge (136) to indicate pressure within the sonic tube (104).

According to the embodiment of FIG. 2, the sonic tube (104) is disposed at an angle (α) from horizontal. The angle (α) facilitates the release of any air contained within the sound absorbing sonic tube (104) through the air release valve (134). The angle (α) is preferably about 30 degrees according to the embodiment shown, but other angles, include an angle coincident with the horizontal, may also be used.

The fill line (128) is also in fluid communication with a pump (138) when a pump valve (140) is open. Therefore, the pump (138) may pressurize the sonic tube (104) when the pump valve (140) is open and the fill valve (130) and air release valve (134) are closed. According to some embodiments, the sonic tube (104) is pressurized to at least 300 psi after the sonic tool (102) is inserted and the interstitial spaces are filled with water. According to other embodiments, the sonic tube (104) is pressurized to approximately 500 psi. Pressurizing the sonic tube (104) to approximately 500 psi improves the accuracy of calibration, as the high-pressure calibration environment more closely represents the eventual operating conditions of the sonic tool (102) than the local atmospheric conditions under which sonic receivers are often calibrated.

Figure 3:
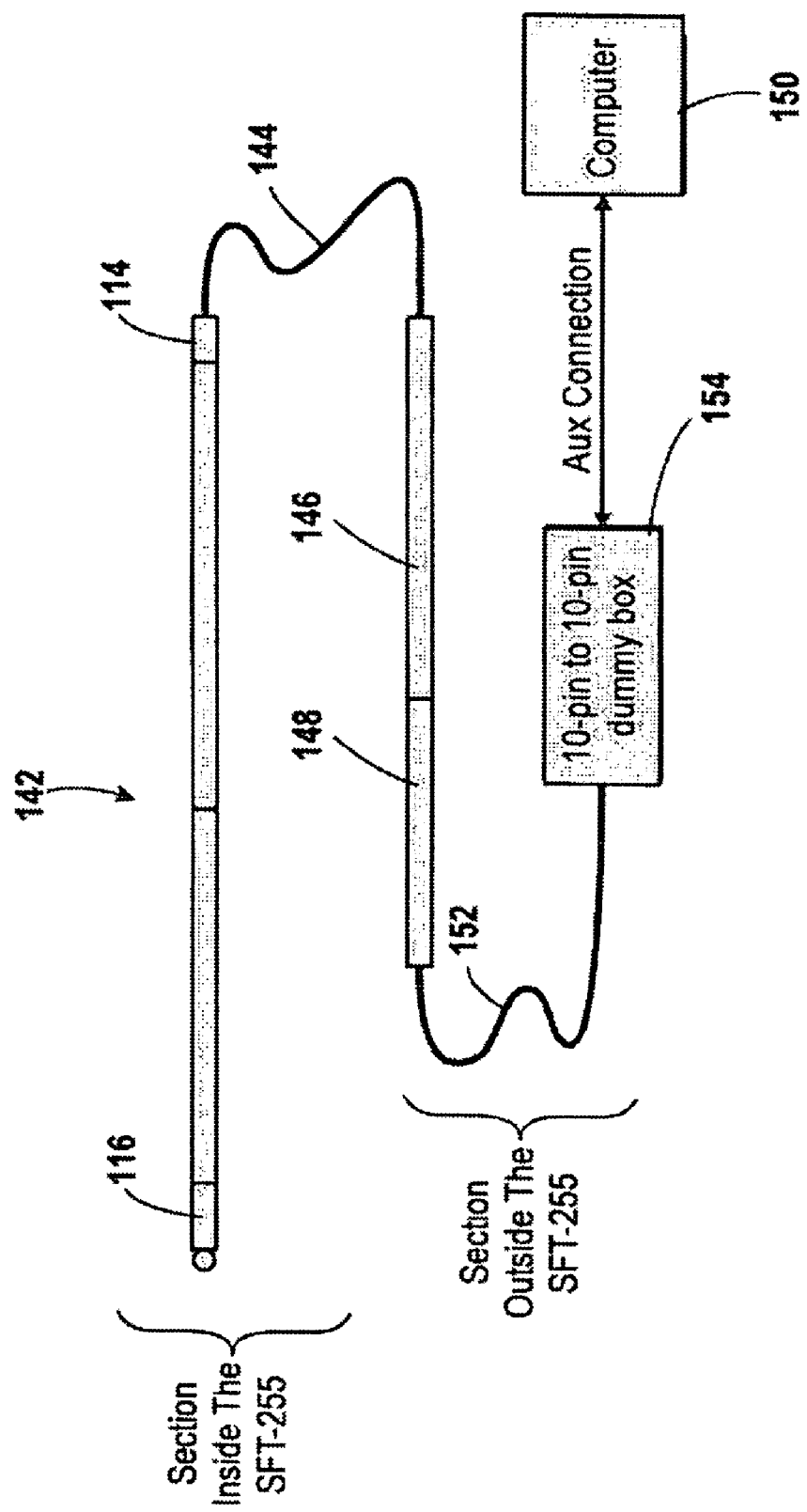
FIG. 3 is a diagrammatical representation of the electronics associated with the acoustic tool and acoustic chamber according to one embodiment of the present invention.

Referring next to FIG. 3, an electrical schematic of the acoustic calibration system (100) is shown. As shown in FIG. 3, a receiver array (142) comprising the sonic receivers (112, FIG. 1) and the upper and lower monopole transmitters (114, 116) are located inside the sonic tube (104). A first communication cable, for example a 31-pin to 31-pin cable jumper (144) extends from the sonic tool (102) and out of the sonic tube (104). The cable jumper connects the sonic tool (102) to an electronics cartridge (146) and a telemetry cartridge (148). The electronics cartridge (146) and the telemetry cartridge (148) may eventually be used to communicate between the sonic tool (102) and a surface control module, such as a computer (150). A second communication cable, for example a 31-pin to 10-pin jumper cable (152), extends from the telemetry cartridge (148) to connect the sonic tool (102) with the computer (150). A 10-pin to 10-pin dummy box (154) may be disposed between the 31-pin to 10-pin jumper cable (152) and the computer (150).

The computer (150), the electronics cartridge (146), or the electronics package (108, FIG. 1) may contain calibration processing instructions that, when executed, automatically calibrate one or more of the sonic receivers (112, FIG. 1). The processing instructions may comprise methods of calibrating, some of which are described in further detail below.

Referring again to FIG. 1, according to principles of the present invention, the sonic receivers (112) are mounted to the sonic tool (102), the sonic tool is inserted into the sound absorbing sonic tube (104), and the sonic receivers (112) are calibrated. A uniform acoustic pressure field is generated to facilitate calibration of the sonic receivers (112). In order to better calibrate the sonic receivers (112), a uniform acoustic pressure field may be generated by pressurizing the sonic tube (104) as described above. Thereafter, acoustic waves are generated in the sound absorbing sonic tube (104) and measured by each of the plurality of sonic receivers (112).

Figure 4A:
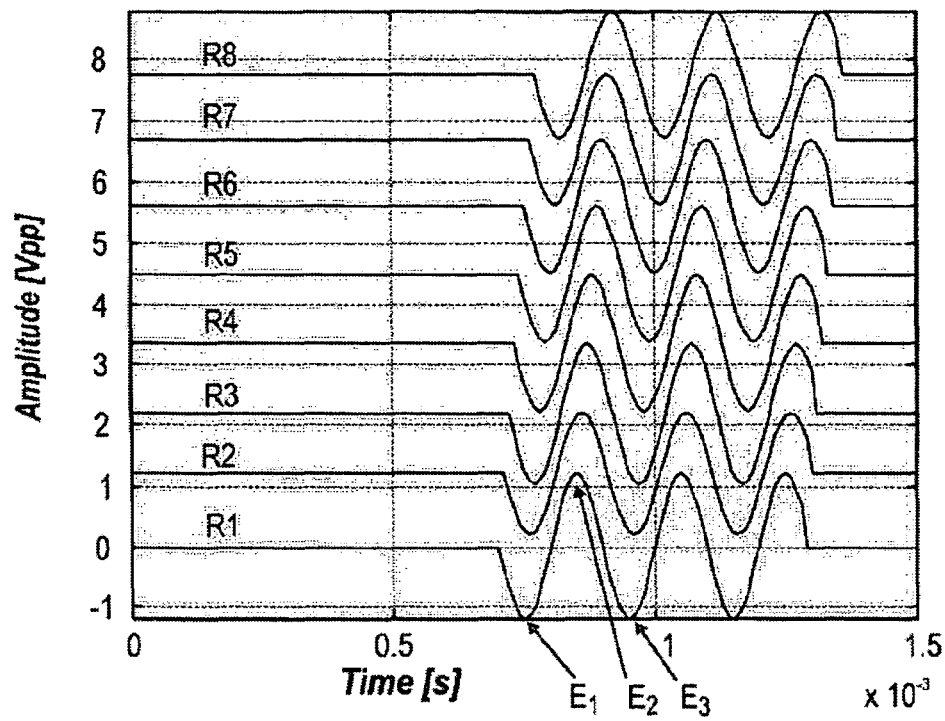
FIG. 4A is a waveform frame at a first receiver station of the acoustic tool prior to applying any compensation factors to the receivers.

Referring to FIG. 4A, each of eight azimuthally located receivers (112, indicated as R1–R8 in FIG. 4A) at any receiver station may measure a waveform. The waveform may be generated by one of the upper or lower monopole transmitters (114, 116). FIG. 4A represents a single waveform separately received by each of the receivers (R1-R8) prior to any calibration. As shown in the figure, the amplitude measured by each of the receivers (R1–R8) varies for the same wave generated by the transmitter by as much as 20%. In addition, the time of wave-receipt by each of the receivers (R1-R8) varies by as much as 60 µs. For instance, with a gain mismatch of 2 dB and phase mismatch of 20 degrees, the dipole-to-monopole ratio will be much less than 30 dB. Therefore, without calibration, dipole measurements will likely be contaminated by non-dipole modes. Studies have shown that a dipole-to-monopole ratio of at least 30 dB guarantees rejection of non-dipole modes. Further, a dipole-to-monopole ratio of at least 30 dB is assured if the gain mismatch is corrected to less than about 1.0 dB and the phase mismatch is corrected to less than about 1.5 degrees. Therefore, according to one method of the present invention, the receivers (R1-R8) at each receiver station are calibrated to a gain and phase mismatch of no more than 1.0 dB and 1.5 degrees, respectively.

Figure 4B:
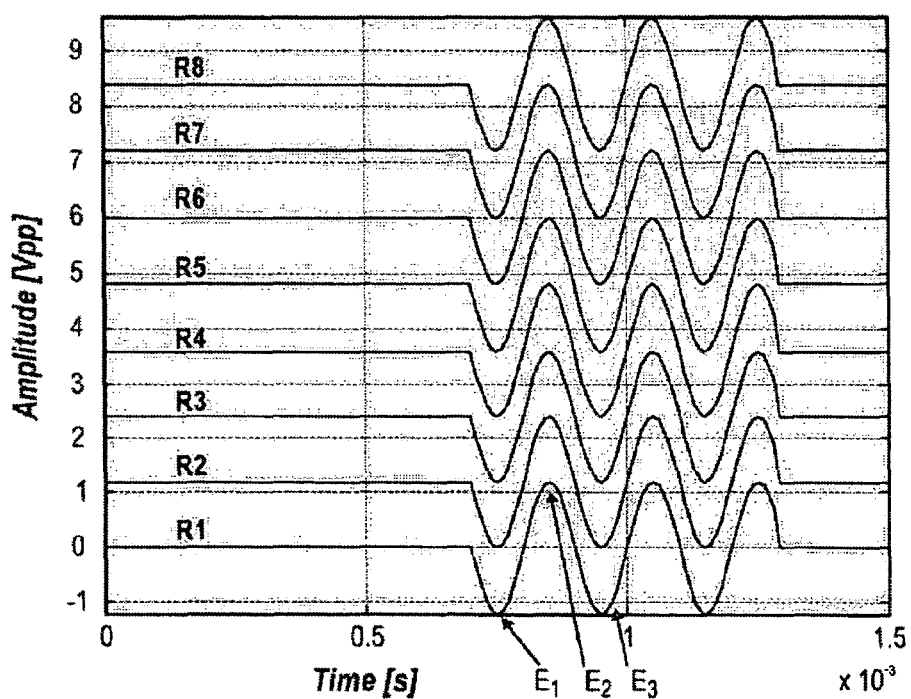
FIG. 4B is a waveform frame at the first receiver station of the acoustic tool following application of compensation factors to the receivers according to one embodiment of the present invention.

In order to calibrate the gain and phase mismatch to no more than 1.0 dB and 1.5 degrees, an algorithm generates compensation factors for one or more receivers at one or more frequency conditions. When the appropriate compensation factors are applied to the waveforms generated by the receivers (R1-R8) shown in FIG. 4a, each of the corrected measured waveforms is within 1.0 dB and 1.5 degrees as shown in FIG. 4B.

According to typical calibration techniques, sonic receivers are not only calibrated while separate from their associated sonic tools, they are also normally calibrated at only one frequency and based on only a single acoustic transmitter source. However, sonic receivers often exhibit different sensitivities to different transmitters and different frequencies. Therefore, according to some embodiments of the present invention, the sonic receivers (112, FIG. 1) are calibrated with multiple gain and phase compensation factors. For example, according to some aspects of the present invention, one or more of the sonic receivers (112) is calibrated with a gain and a phase compensation factor for three different frequencies generated from two different transmitters. Therefore, the one or more sonic receivers (112) may have six gain compensation factors and six phase compensation factors. The six gain and phase compensation facts are generated from the six different possible combinations of two transmitters separately generating three different frequencies at different intervals. However, fewer or additional compensation factors based on different numbers of transmitters and frequency combinations may also be calculated. Nevertheless, according to one embodiment of the present invention, six gain and phase compensation factors are calculated for one or more of the sonic receivers. The three gain and phase compensation factors computed for each of the two different transmitters are then preferably averaged to yield a total of three gain and phase factors, one for each of the three frequencies. The two transmitters may include the upper and lower monopole transmitters (114, 116) described above, and the three different frequencies may include a low, a mid, and a high frequency.

One algorithm for calculating the gain and phase compensation factors to calibrate the sonic receivers (112) is described below with reference to FIGS. 5–9. In order to avoid calibrating individual sonic receivers (112, FIG. 1) based on measurements that may not be representative of true receiver sensitivity, a plurality of waveforms is averaged for each sonic receiver (112). Further, because the orientation of the sonic tool (102, FIG. 1) may not be exactly concentric with the sonic tube (104, FIG. 1), waveforms may be generated at a plurality of rotational orientations for the sonic tool (102) within the sound absorbing sonic tube (104, FIG. 1) and included in an averaging procedure.

Figure 5:
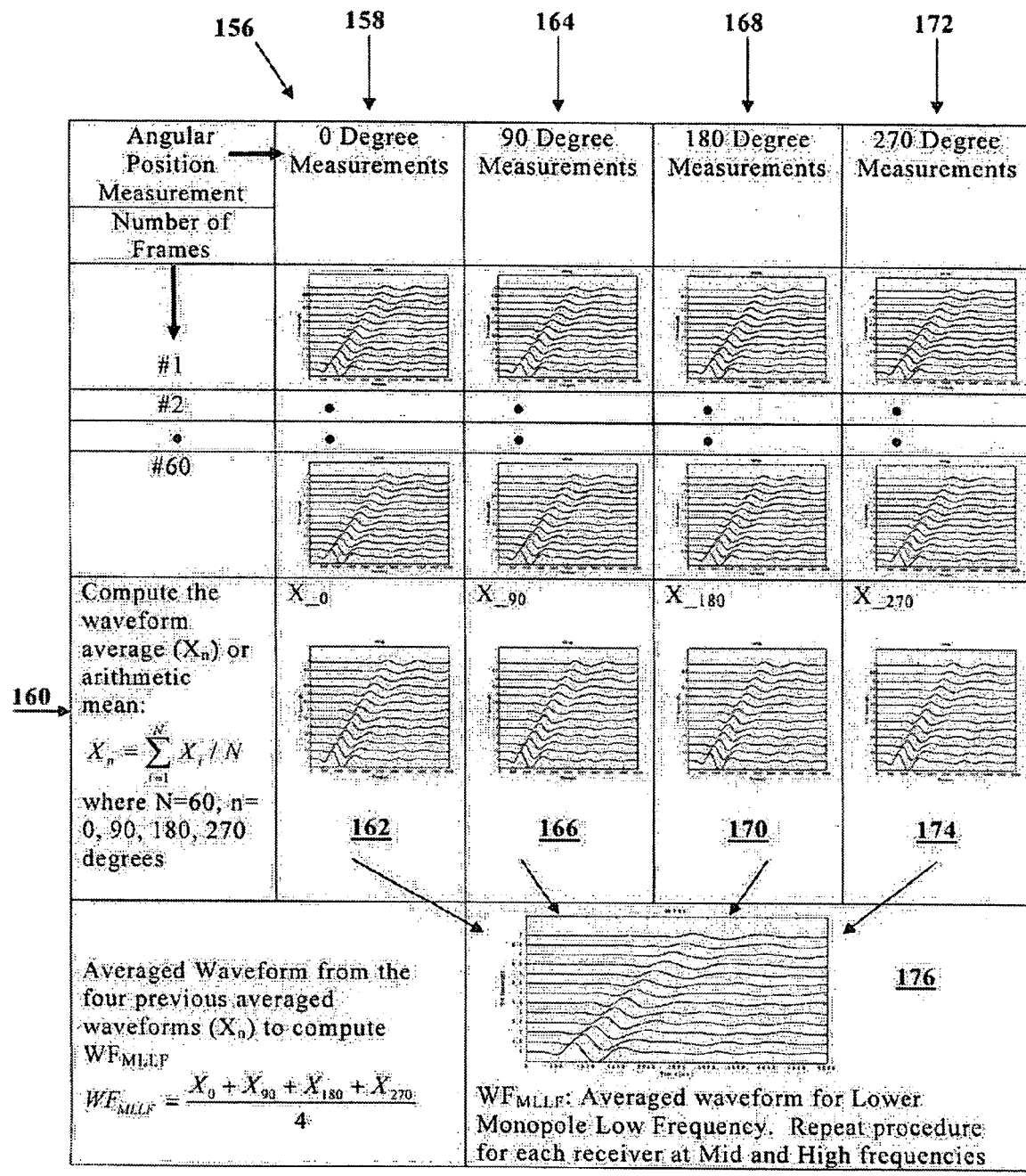
FIG. 5 is a series of exemplary waveforms illustrating a waveform averaging procedure according to one embodiment of the present invention.

One exemplary averaging procedure is shown in FIG. 5. FIG. 5 illustrates a plurality of raw waveforms received by one sonic receiver (112, FIG. 1) located at each of the 13 receiver stations. The raw waveforms are designated generally at (156) and are divided into frames. The frames are divided by tool orientation. According to FIG. 6A, the sonic tool (102) is arranged in the sonic tube (104) in a first orientation shown. A first column (158) of the chart shown in FIG. 5 corresponds to measurements taken by the receivers (112) at the first orientation of FIG. 6A. The first column (158) also represents waveforms measured by the receivers (112, FIG. 1) as waves are generated at a single frequency by one of the sonic transmitters, which, for purposes of discussion, is a low frequency generated by the lower monopole transmitter (116, FIG. 1). A plurality of waveform frames is measured by the receivers (112, FIG. 1) to create a representative sample of receiver sensitivity. For example, according to some embodiments, at least 30 waveform frames are measured, and according to the embodiment shown in FIG. 5, 60 waveform frames are measured. The plurality of waveform frames represented by the first column (158) is averaged at an averaging row (160) to created an average waveform (162) for the receivers (112, FIG. 1) at the first sonic tool orientation shown in FIG. 6A.

Figure 6A:
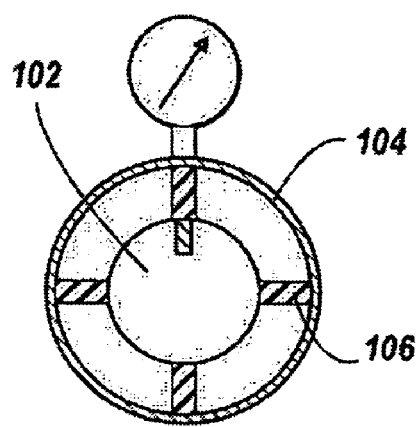
FIG. 6A is a cut-away end view of the acoustic tool housed within the acoustic chamber in a first orientation according to one embodiment of the present invention.
Figure 6B:
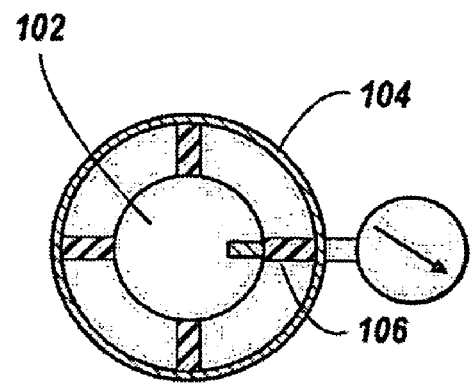
FIG. 6B is a cut-away end view of the acoustic tool housed within the acoustic chamber in a second orientation according to one embodiment of the present invention.
Figure 6C:
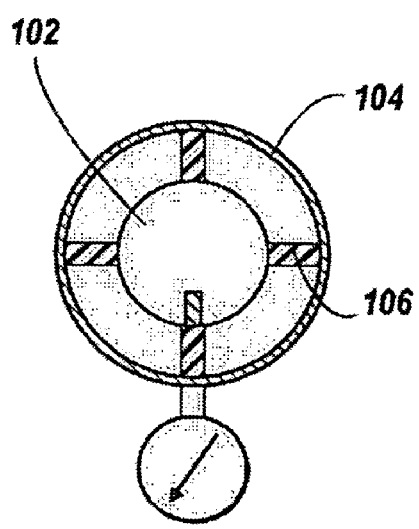
FIG. 6C is a cut-away end view of the acoustic tool housed within the acoustic chamber in a third orientation according to one embodiment of the present invention.
Figure 6D:
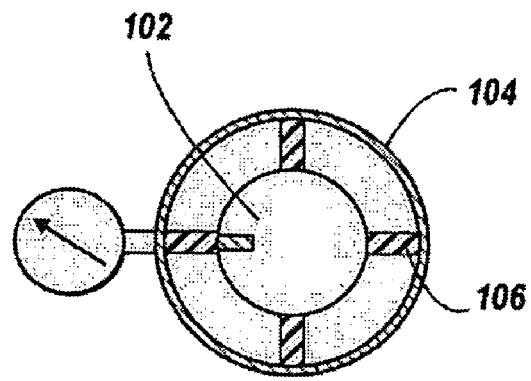
FIG. 6D is a cut-away end view of the acoustic tool housed within the acoustic chamber in a fourth orientation according to one embodiment of the present invention.

Similarly, a second column (164) of the chart shown in FIG. 5 corresponds to measurements taken by the receivers (112, FIG. 1) according to the same parameters of the first column (158), but with the sonic tool (102) arranged in a second orientation as shown in FIG. 6B. The waveforms of the second column (164) are also averaged to create a second average waveform (166). The third and fourth columns (168, 172) follow the same pattern as the first and second columns (158, 164), but at third and fourth sonic tool (102) orientations shown in FIGS. 6C and 6D, respectively. Accordingly, the waveforms of the third and fourth columns (168, 172) are each averaged to created third and fourth averaged waveforms (170, 174). It will be understood by those of skill in the art having the benefit of this disclosure, however, that any number of columns may be created, including only one, and each may correspond to a different sonic tool (102) orientation. However, according to FIGS. 6A–6D, there are four tool orientations, rotationally offset from one another by approximately 90 degrees.

When the four averaged waveforms (162, 166, 170, 174) have been created (or any number of others), the averaged waveforms may themselves be averaged to create a master average waveform (176). The master average waveform (176) is a very accurate average of the waves detected by one of the sonic receivers at each of the 13 receiver stations.

The master average waveform (176) is, however, only representative of one sonic receiver at each receiver station and at the first set of parameters mentioned above (the lower monopole transmitter (116) generating low frequency waves). Other figures similar to FIG. 5 are created for other parameters and other sonic receivers. For example, as mentioned above, according to one aspect of the present invention there are five additional figures similar to FIG. 5: one each for mid and high frequencies generated by the lower monopole transmitter (116), and one each for low, mid, and high frequencies generated by the upper monopole transmitter (114). In addition, additional figures similar to FIG. 5 (sets of 6 figures according to the present embodiment defining 6 transmitter/frequency combinations) are created for each azimuthally arranged sonic receiver (112) located at each of the 13 receiver stations shown in FIG. 1.

Figure 7A:
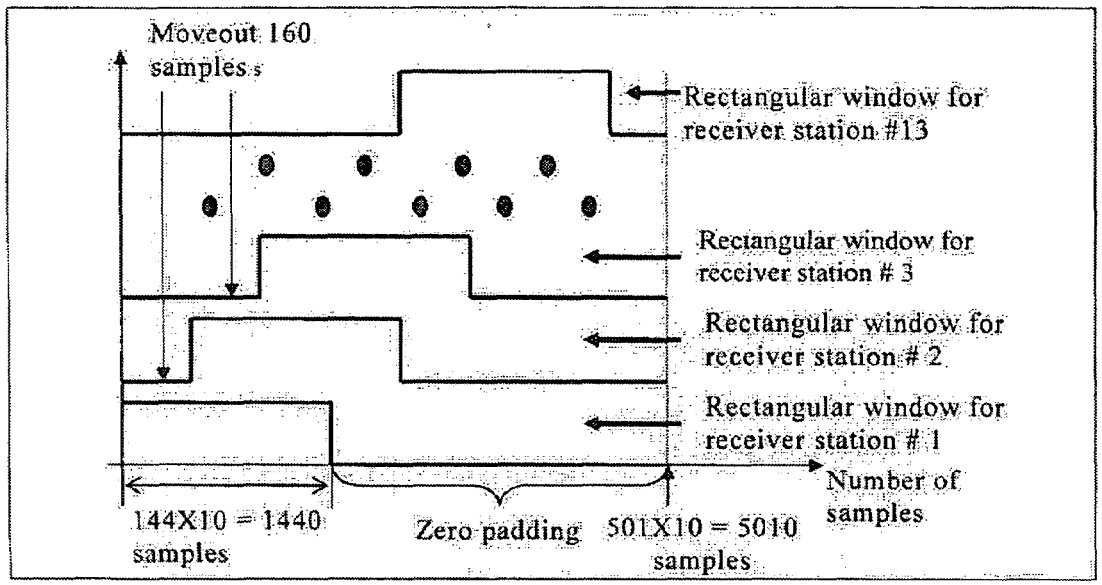
FIG. 7A–7D illustrates a windowing technique that may be applied to a waveform according to one embodiment of the present invention.
Figure 7B:
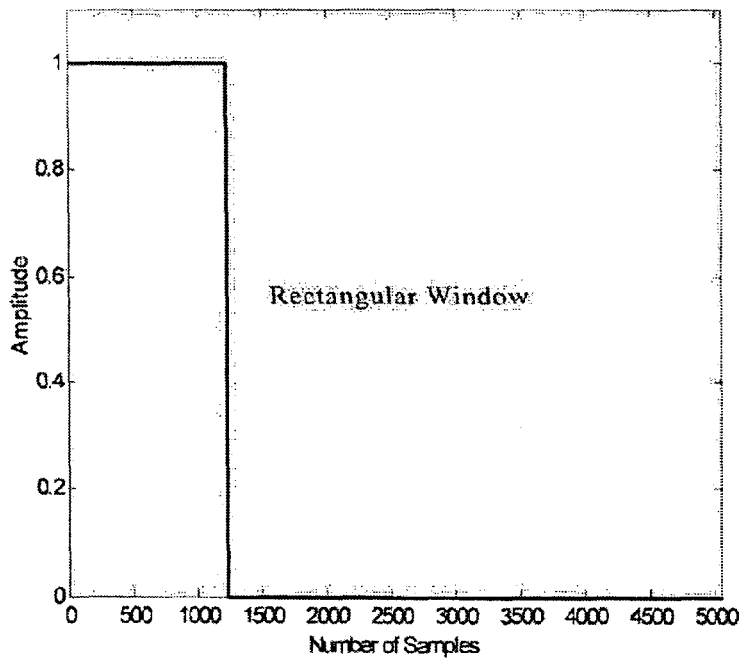
Figure 7C:
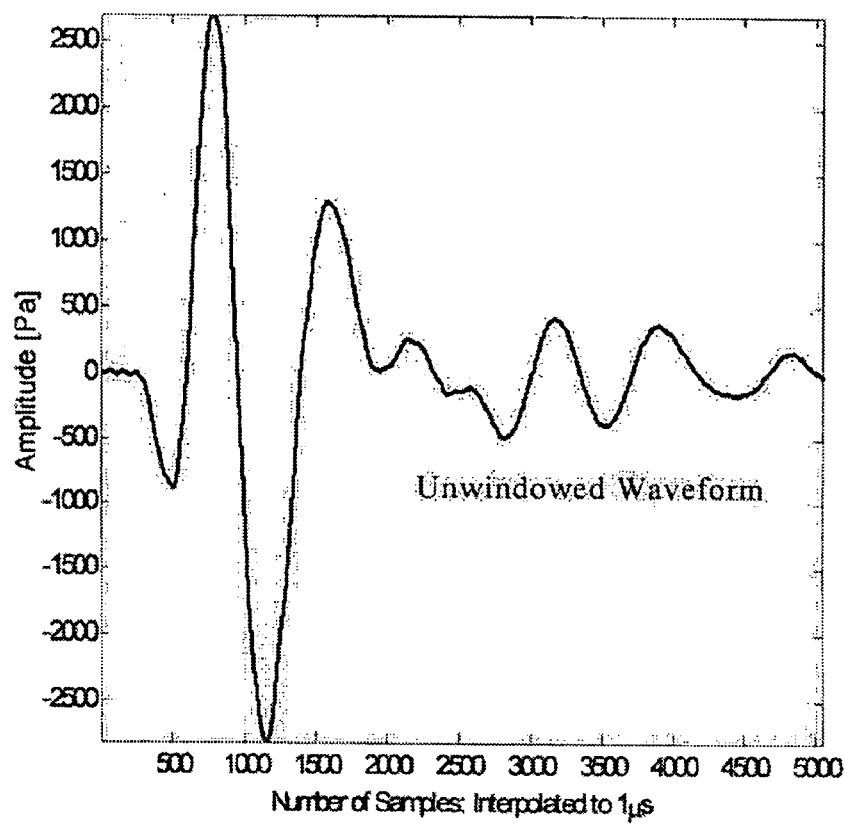
Figure 7D:
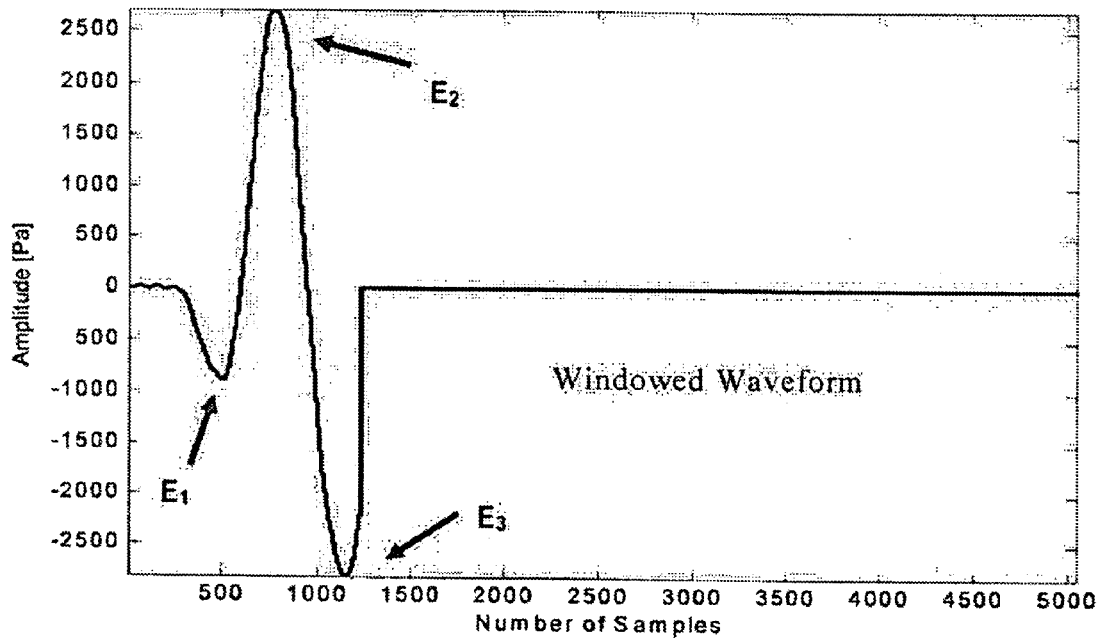

The master average waveform (176) (and each other master average waveform created) may optionally be windowed to eliminate all but the strongest wave modulations as shown in FIGS. 7A–7D. According to FIG. 7A, low frequency master averaged waveforms (176) are band pass filtered and then each master averaged waveform (176) is linearly interpolated to a I is sampling. A rectangular window (178) is generated for the interpolated waveforms as shown in FIG. 7A for each receiver station. The rectangular windows (178) are then applied to the master average waveform (176). For example, the rectangular window (178) for the first receiver station as shown in FIG. 7B is applied to the master average waveform (176) associated with one receiver (R1) as shown in FIG. 7C to create a windowed waveform shown in FIG. 7D. This windowing procedure may then be applied to all generated master average waveforms (176). According to the sonic tool (102) shown in FIG. 1, the result would be 104 individual windowed waveforms (13 receiver stations with 8 azimuthal sonic receivers located at each) for each of the 6 transmitter/frequency combinations. As shown in FIG. 7D, only the three most pronounced wave measurements remain following the windowing procedure: a first valley (E1), a first peak (E2), and a second valley (E3). It will be understood, however, that according to some embodiments other windowing techniques are used and according to others there is no windowing. For example, low frequency master averaged waveforms (176) may be windowed according to the method described above, while mid and high frequency master averaged waveforms may be windowed to eliminate all but the first valley (E1) as shown later in FIGS. 9A–9B. In addition, mid and high frequency master averaged waveforms may be high pass filtered prior to any windowing.

When the windowed waveforms have been generated (or, if there is no windowing, the master average waveforms (176)) for each sonic receiver (112) and each transmitter/frequency combination, the individual windowed waveforms are examined at each receiver station to determine which one of the sonic receivers at each receiver station exhibits the greatest sensitivity for each of the transmitter/frequency combinations. According to some embodiments, the sonic receiver at each receiver station that is determined to have the greatest sensitivity is then assigned as a reference receiver and has an associated reference waveform. However, assigning a reference receiver and associated waveform is not limited to the most sensitive receiver. Other choices may also be made on any criteria. Accordingly, a windowed waveform for one receiver at each receiver station is assigned as a reference for each transmitter/frequency combination. Each windowed waveform that is not assigned as the reference waveform is then compared to the reference waveform to generate a gain and a phase compensation factor corresponding to each non-reference receiver for a given transmitter/frequency combination. For example, for purposes of discussion we presume that the windowed waveform shown in FIG. 7D is chosen as the reference waveform and corresponds to a first sonic receiver located at a first receiver station. The reference waveform for the first sonic receiver is transferred to the graph shown in FIG. 8A, which also includes a mismatched windowed waveform associated with a second sonic receiver located at the first receiver station.

The differences between the mismatched windowed waveform and the reference waveform are analyzed to calculate a gain and a phase compensation factor for the second sonic receiver. According to some embodiments, for low frequencies the gain factor is calculated by dividing a difference between a first peak ($E_{2R}$) of the reference waveform and a second valley ($E_{3R}$) of the reference waveform by a difference between a first peak ($E_{2C}$) of the mismatched windowed waveform and a second valley ($E_{3C}$) of the mismatched windowed waveform as follows:

$$\text{Gain\_factor}(g_{LF}) = \frac{E_{2R} - E_{3R}}{E_{2C} - E_{3C}} \quad (1)$$

The delay or phase compensation factor for low frequency corrections is calculated as a difference between a time of a first peak ($E_{2R}$) of the reference waveform and a time of a first peak ($E_{2C}$) of the mismatched windowed waveform as follows:

$$\text{Delay\_factor}(\tau_{LF}) = TE_{2R} - TE_{2C} \quad (2)$$

where $TE_{2R}$ and $TE_{2C}$ are the times when $E_{2R}$ and $E_{2C}$ are at a maximum.

If gain and delay compensation factors have been separately calculated at a particular frequency or set of frequencies for each of a number of multiple transmitters, preferably the gain and delay factors are averaged to yield a single gain and delay factor for a given frequency or set of frequencies. For example, if a first gain factor ($g_{MLLF}$) for a particular receiver is calculated based on a low frequency generated by the lower monopole transmitter (116, FIG. 1), and a second gain factor ($G_{MULF}$) is also calculated at a low frequency but generated by the upper monopole transmitter (114, FIG. 1), an average of the two gain factors is assigned as the low frequency gain factor for the particular receiver. Accordingly, we have:

$$g_{LF} = \frac{g_{MLLF} + g_{MULF}}{2} \text{ and}$$

$$\tau_{LF} = \frac{\tau_{MLLF} + \tau_{MULF}}{2}$$

for a two transmitter acoustic tool.

Figure 8A:
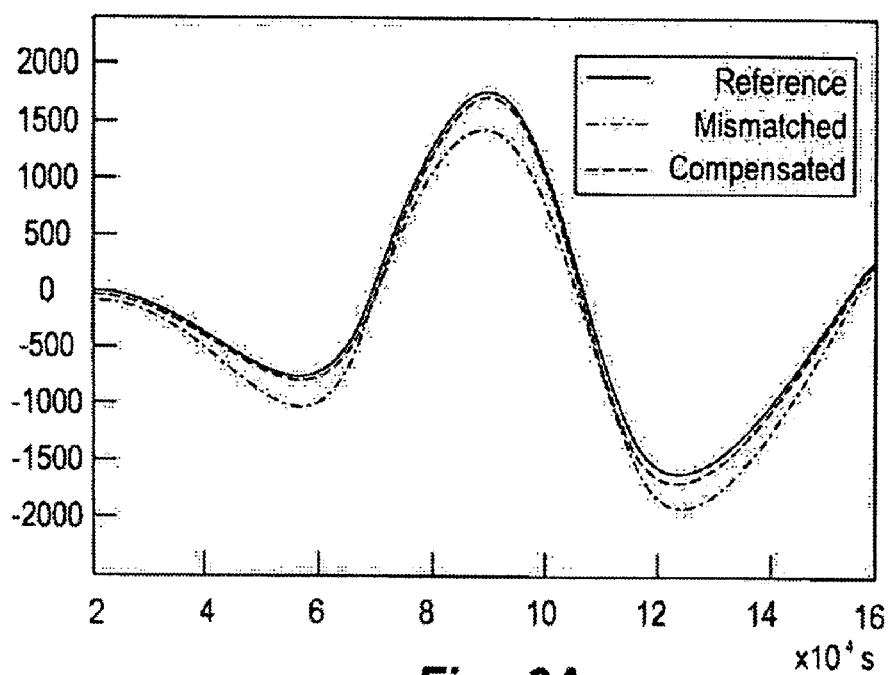
FIG. 8A is a wave diagram illustrating the results of applying compensation factors to mismatched receiver signals at low frequency according to one embodiment of the present invention.

FIG. 8A illustrates the application of the calculated gain and delay factors ($g_{LF}$, $\tau_{LF}$) to the mismatched windowed waveform as a compensated waveform. As shown, the compensated waveform is much closer to the reference waveform, which is the desired result. Both the first receiver and second receiver "see" the same waves, and therefore it is desirable that each of the receivers measure and report approximately the same waveforms. Formation properties (such as formation slowness) estimated from acoustic waveforms are more accurate when the waveforms are more precise, and the waveforms are more precise after the receivers are calibrated according to the method described above.

Figure 8B:
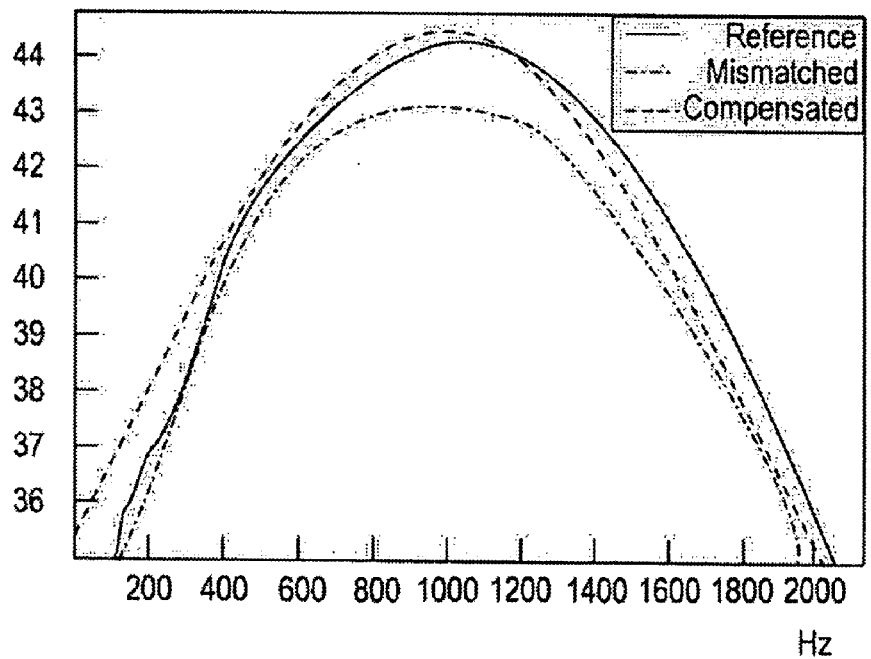
FIG. 8B is a spectral plot illustrating the results of applying compensation factors to mismatched receiver signals at low frequency according to one embodiment of the present invention.

FIG. 8B is a spectral plot and illustrates a reference waveform, a mismatched windowed waveform, and a compensated waveform as a function of frequency. The plot shows, for example, an amplitude mismatch of 0.35 dB at 1.2 kHz, which will result in a dipole-to-monopole ratio of >30 dB and therefore guarantee rejection of non-dipole modes.

A similar or identical compensation factor calculation according to the principles described above is made for each of the non-reference receivers and for each desired transmitter/frequency combination. In addition, each of the calculated compensation factors may be normalized to a maximum value 1.0 to avoid saturation of sonic tool electronics.

However, the compensation factor calculations may be modified from equations (1) and (2) for some frequency/transmitter combinations. For example, for mid and high frequency corrections, the gain factor for each non-reference receiver may be calculated by dividing an amplitude value of the reference waveform at a first valley ($E_{1R}$) by the amplitude value of the mismatched windowed waveform at its first valley ($E_{1C}$) as follows:

$$\text{Gain\_factor}(g_{Mid/HF}) = \frac{E_{1R}}{E_{1C}} \quad (3)$$

Further, according to some embodiments, the delay or phase compensation factor for mid and high frequency corrections is calculated as a difference between a time of a first valley ($E_{1R}$) of the reference waveform and a time of a first peak ($E_{1C}$) of the mismatched windowed waveform as follows:

$$\text{Delay\_factor}(\tau_{Mid/HF}) = TE_{1R} - TE_{1C} \quad (4)$$

Figure 9A:
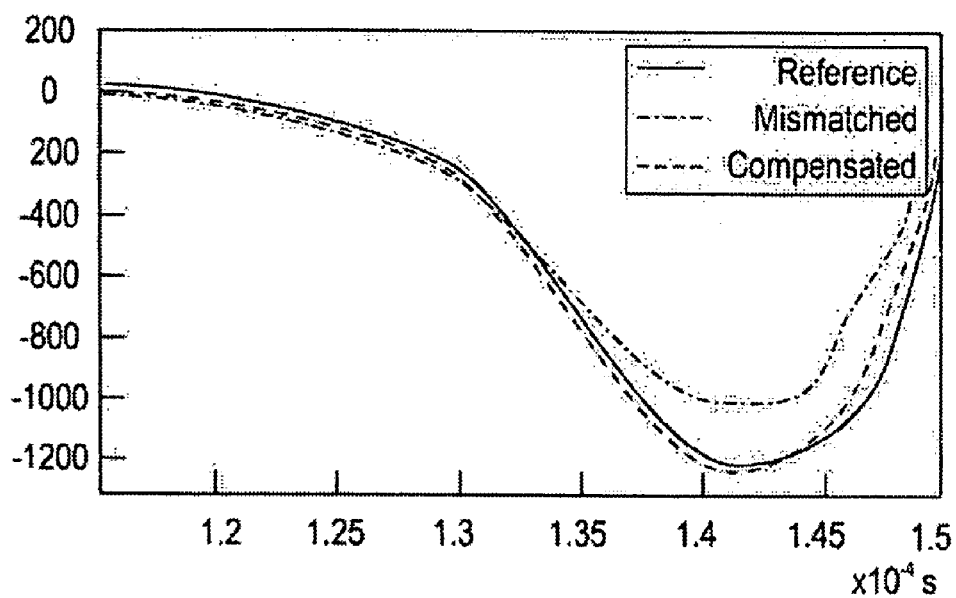
FIG. 9A is a wave diagram illustrating the results of applying compensation factors to mismatched receiver signals at mid or high frequency according to one embodiment of the present invention.
Figure 9B:
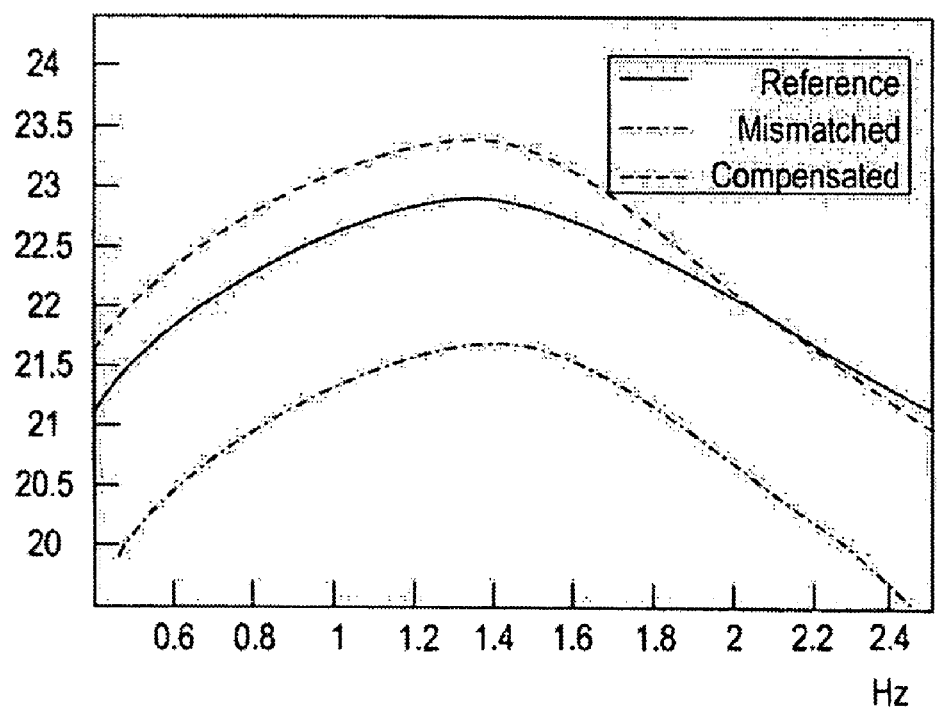
FIG. 9B is a spectral plot illustrating the results of applying compensation factors to mismatched receiver signals at mid or high frequency according to one embodiment of the present invention.

FIGS. 9A and 9B illustrate a real example in the time and frequency domains, respectively, of applying compensation factors calculated according to equations (3) and (4) to a receiver subjected to high frequency parameters. According to FIG. 9B, the amplitude mismatch is 0.5 dB at 14 kHz, and the amplitude mismatch at higher frequencies such as those associated with cement bond logging measurements (20 kHz to 25 kHz) is even less than 0.5 dB. By applying the principles described herein to calibrate acoustic receivers in situ, the acoustic measurements from different receivers of the same wave become much more uniform.

Accordingly, by applying the principles described herein, acoustic receivers can be calibrated while mounted to an acoustic tool by inserting the acoustic tool into an acoustic chamber, averaging waveforms received by each of the acoustic receivers to create an average waveform associated with each of the acoustic receivers, assigning one or more average waveforms as reference waveforms, calculating compensation factors for one or more of the non-reference receivers by measuring the differences between non-reference waveforms and reference waveforms, and applying the compensation factors to the non-reference receivers. The average waveforms may be windowed if desired, and the averages may be calculated according to multiple sonic tool orientations. Several compensation factors may be calculated for one or more of the sonic receivers, includes gain and phase compensation factors for different frequency ranges and different transmission sources.

Figure 10:
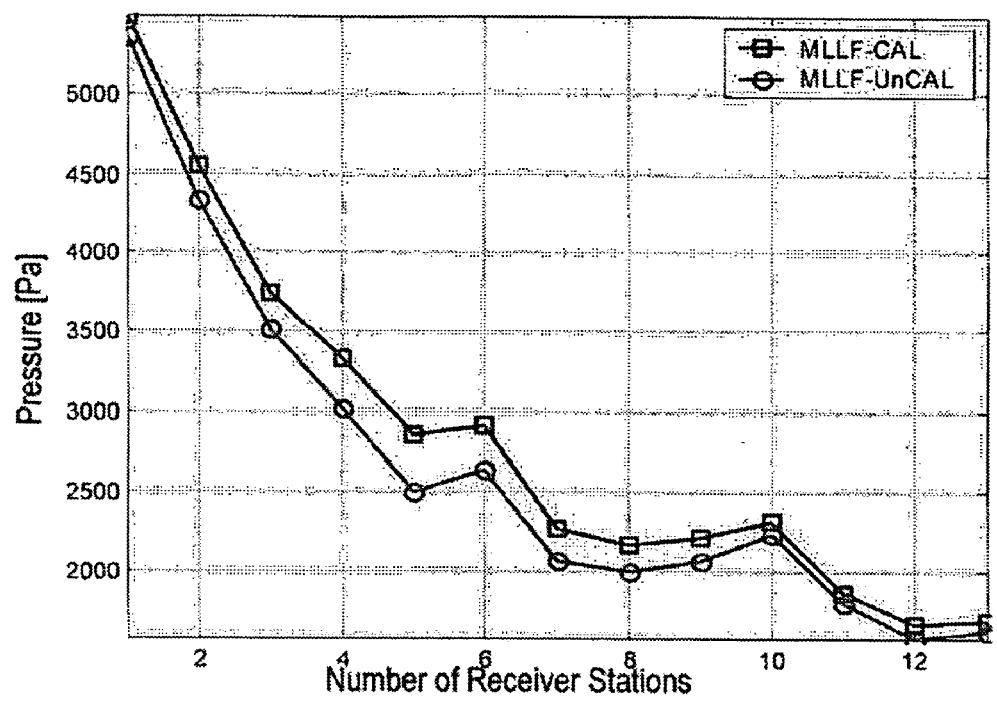
FIG. 10 illustrates computations of average pressure and standard deviation per receiver station before and after applying compensation factors to mismatched receiver signals according to one embodiment of the present invention.
Figure 10:
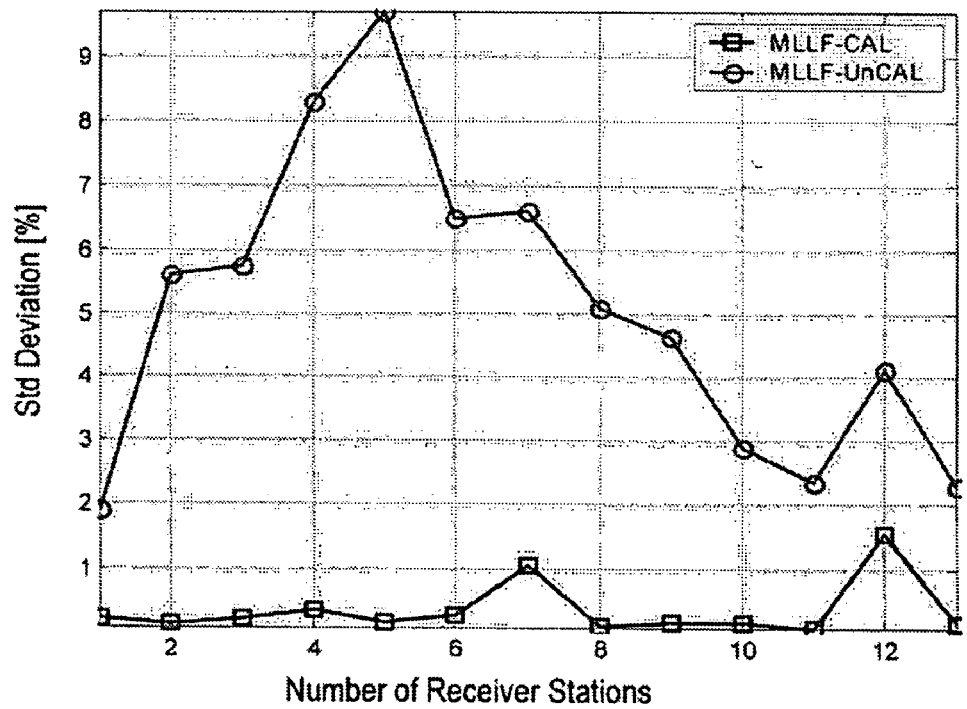

After calibrating the sonic receivers by applying the calculated compensation factors, it may be desirable to verify the effectiveness of the compensation factors. Therefore, according to some methods, average and normalized standard deviations before and after correcting the sonic receivers are computed and plotted. FIG. 10 illustrates an actual statistical analysis of an average and standard deviation of acoustic pressure measurements by a receiver before and after calibrating the receiver. As shown, the standard deviation of the calibrated receivers is significantly lower than that of the uncalibrated receivers, which means more accurate measurements using the compensation factors.

In addition, the effectiveness of the calibration can be verified according to some methods by using the acquired data from the receivers to find casing and Stoneley slowness values via STC processing. The values generated from the acquired data may then be compared with the values predicted by numerical analysis to check for accuracy.

While the figures and description are specific to a sonic tool with multiple receivers at each of multiple stations, the principles described herein may be used for any acoustic tool having an array of acoustic receivers. For example, similar compensation factors can be calculated for an array of axial receivers that has only one receiver at each receiver station by applying known wave attenuation rates through known fluids and measuring the spacings between acoustic receivers.

The preferred embodiments were chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of calibrating one or more individual acoustic receivers mounted to an acoustic tool for borehole logging comprising:
    inserting the tool into an acoustic chamber;
    generating acoustic waves in the acoustic chamber:
    receiving acoustic waves with the receivers to calibrate one or more of the acoustic receivers mounted to the acoustic tool.

2. The method of claim 1, further comprising:
    averaging waveforms received by each of a plurality of acoustic receivers to create an average waveform associated with each of the plurality of acoustic receivers;
    assigning one average waveform as a reference waveform;
    calculating compensation factors for one or more of the plurality of receivers.

3. The method of claim 2, wherein the calculating comprising measuring differences between the reference waveform and one or more of the remaining average waveforms.

4. The method of claim 2, wherein the calculating comprises computing three gain and three time delay compensation factors for each of the plurality of receivers, one for each of a low, mid, and high frequency range.

5. The method of claim 2, wherein the generating further comprises generating acoustic waves in each of at least two different axially rotated positions.

6. The method of claim 5, wherein the at least two different axially rotated positions comprise four positions offset by approximately ninety degrees.

7. The method of claim 2, further comprising calculating compensation factors for each of the plurality of receivers except for a reference receiver.

8. A system for calibrating one or more individual acoustic receivers mounted on an acoustic tool comprising:
    at least one source and a plurality of receivers mounted on the acoustic tool;
    an acoustic chamber receptive of the acoustic tool;
    a plurality of spacers arranged about the acoustic tool to support the acoustic tool substantially concentric with the acoustic chamber; the acoustic tool being configured to calibrate each of the plurality of receivers while the receivers are mounted on the acoustic tool.

9. The system of claim 8, further comprising multiple receiver stations spaced axially along the acoustic tool, wherein each of the multiple receiver stations comprises a plurality of azimuthally arranged receivers.

10. The system of claim 8, wherein the acoustic chamber is pressurized to at least 300 psi.

11. The system of claim 8, wherein the acoustic toot comprises an upper and a lower monopole source with the receivers located between the upper and lower monopole source.

* * * * *